United States Patent [19]

Baker et al.

[11] 4,149,837
[45] Apr. 17, 1979

[54] SULPHUR PELLETIZING APPARATUS

[76] Inventors: Ronald Baker, 2916 - 11th Ave. NW.;
Ronald B. Fletcher, 24 Rosery Place
NW., both of Calgary, Alberta,
Canada

[21] Appl. No.: 867,147

[22] Filed: Jan. 5, 1978

Related U.S. Application Data

[63] Continuation-in-part of Ser. No. 669,029, Mar. 22, 1976, abandoned.

[51] Int. Cl.² ............................................. B22D 23/08
[52] U.S. Cl. ........................................ 425/10; 264/14
[58] Field of Search ................... 425/6, 10, 7; 65/141; 264/14

[56] References Cited

U.S. PATENT DOCUMENTS

| | | | |
|---|---|---|---|
| 1,612,167 | 12/1926 | Beardsley et al. | 425/10 X |
| 1,959,014 | 5/1934 | Woodward | 425/10 X |
| 2,570,423 | 10/1951 | Batchelder et al. | 425/10 |
| 2,574,357 | 11/1951 | Stammer et al. | 425/6 X |
| 2,738,548 | 3/1956 | Kassel | 425/6 X |
| 3,550,195 | 12/1970 | Campbell | 425/10 |

FOREIGN PATENT DOCUMENTS 1244441  9/1960  France ...................... 425/10

Primary Examiner—Robert L. Spicer
Attorney, Agent, or Firm—Stanley G. Ade

[57] ABSTRACT

An apparatus for converting molten elemental sulphur into solid pellets is described. Droplets of molten sulphur are passed through a liquid cooling medium, preferably water, the medium being maintained at a temperature range wherein annealing of the sulphur will occur. The pellets thereby obtained are hard surfaced, resistant to crushing and have low water retention in storage. In one embodiment semi-molten droplets are flattened during passage through the cooling medium by engaging deflection plates so that less flowable and more economically storable pellets are obtained.

12 Claims, 4 Drawing Figures

SULPHUR PELLETIZING APPARATUS

BACKGROUND OF THE INVENTION

This is a continuation-in-part application to Ser. No. 669,029 filed Mar. 22, 1976, and now abandoned.

This invention relates to an apparatus for converting molten elemental sulphur into solid pellets. More particularly, it relates to the annealing of molten sulphur droplets by passing them through a liquid cooling medium maintained in the annealing temperature range of sulphur.

Large quantities of sulphur are recovered in a molten form by the Frasch process or from hydrogen sulphide gas present in natural gas or crude oil. However, it ic inconvenient and expensive to store this sulphur in a molten form. Conventional methods of handling molten sulphur comprise pouring it into forms and allowing the sulphur to solidify into large blocks. Such blocks must be broken up and crushed before the solid sulphur is transported to consumers.

In U.S. Pat. No. 3,649,217 of John H. Bailey, which issued on Mar. 14, 1972, there is described a process for solidifying molten sulphur by passing it through a zone of cooling water. However, this zone is maintained at a temperature between room temperature and 150° F. and the droplets are quenched by this cooling medium. The quenched pellets are usually hollow, pocked with pin holes and resemble somewhat pieces of popcorn. When these pellets are handled extensively they crumble and give rise to considerable dusting. Because of their porous structure the pellets have a tendency to retain moisture. The moisture retention adds a significant amount of weight to the pellet imposing a costly disadvantage in shipping.

We have now discovered that if droplets of molten sulphur are passed through a liquid medium at temperatures in excess of 150° F. and preferably approaching the melting point of sulphur they are annealed into pellets having a very smooth, hard and non-porous surface. The amount of liquid retention in such pellets is very low. The annealed sulphur pellets are tougher and more durable than pellets prepared by quenching thereby lessening the possibility of breaking and dusting during handling.

In a preferred embodiment the apparatus comprises an enclosed system from which sulphur vapour does not escape into the atmosphere. The cooling liquid medium is recycled into the cooling zone so that no polluting liquid effluents are discharged.

With the foregoing in view, and other such advantages as will become apparent to those skilled in the art to which this invention relates as this specification proceeds, our invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
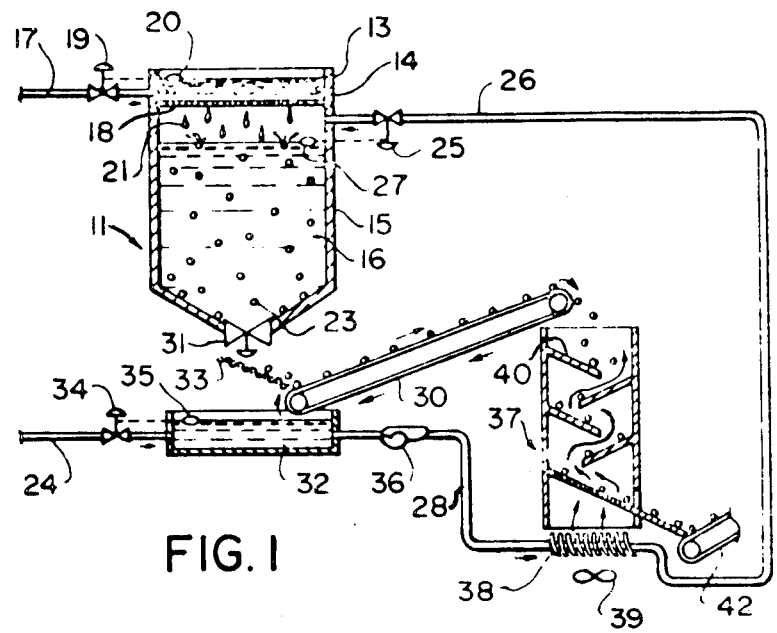
FIG. 1 is a schematic diagram of the annealing apparatus and related drying apparatus of the invention, the pelletizing vessel and drying column being shown in vertical section.

In the embodiments shown pelletizing vessel 11 is divided into a molten sulphur chamber 13 and an annealing chamber 15 by a perforated plate 18. A source of molten sulphur is fed into chamber 13 through molten sulphur feed line 17, its flow being regulated by valve 19 which is controlled by float 20. A constant head of molten sulphur 14 is thereby provided in molten sulphur chamber 13. The temperature of the molten sulphur is maintained in the range 250°-350° F. Heating means such as electric heating coils may be provided in plate 18 to inhibit freezing of sulphur in the perforations. However, heating of the plate is not essential and would only be beneficial during startup as heat from the molten sulphur is sufficient to prevent unwanted freezing in the perforations.

Figure 2:
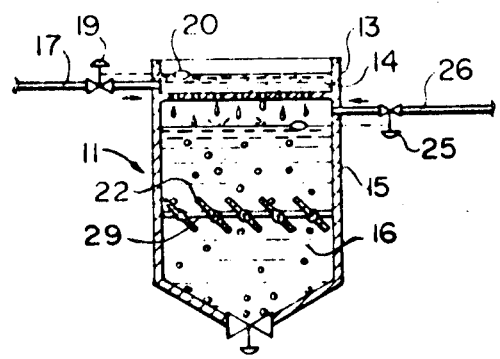
FIG. 2 is a vertical section of an alternative embodiment of the pelletizing vessel shown in FIG. 1.

In the embodiment shown in FIGS. 1 and 2 annealing chamber 15 is provided with a supply of liquid cooling medium, preferably water. The water is supplied through inlet valve 25, its level being regulated by float 27. The temperature of the water is maintained in a range between above about 150° F. up to but below the melting point of sulphur, preferably in the range 180°-230° F. The vessel is preferably suitably reinforced to be able to withstand superatmospheric pressures.

Although water is the economically preferable liquid cooling medium, other liquids may be employed. the liquid cooling medium must be one which does not leave a coating or film on the sulphur pellets and one in which sulphur is either insoluble or else very sparingly so. Preferably the liquid cooling medium should have a boiling point close to the melting point of sulphur so that the initial loss of heat of the sulphur droplets upon immersion is minimized. Propyl and butyl alcohols are examples of other suitable coolants.

One embodiment of the pelletizing process according to the invention is shown in operation in FIG. 1. Liquid sulphur passes through the perforations in plate 18 as droplets 21 which fall into the liquid 16. As the droplets pass through this cooling zone they are annealed into hard smooth sulphur pellets 23 by the time they reach the bottom of pelletizing vessel 11.

There is provided a rotary outlet valve 31 at the bottom of the vessel 11 for discharging effluent cooling liquid and annealed sulphur pellets. Immediately below outlet valve 31 screen 33 separates pellets and cooling liquid. The pellets are conveyed by endless belt conveyor 30 into drying tower 37 and thence are conveyed to a storage area by endless belt conveyor 42.

Figure 4:
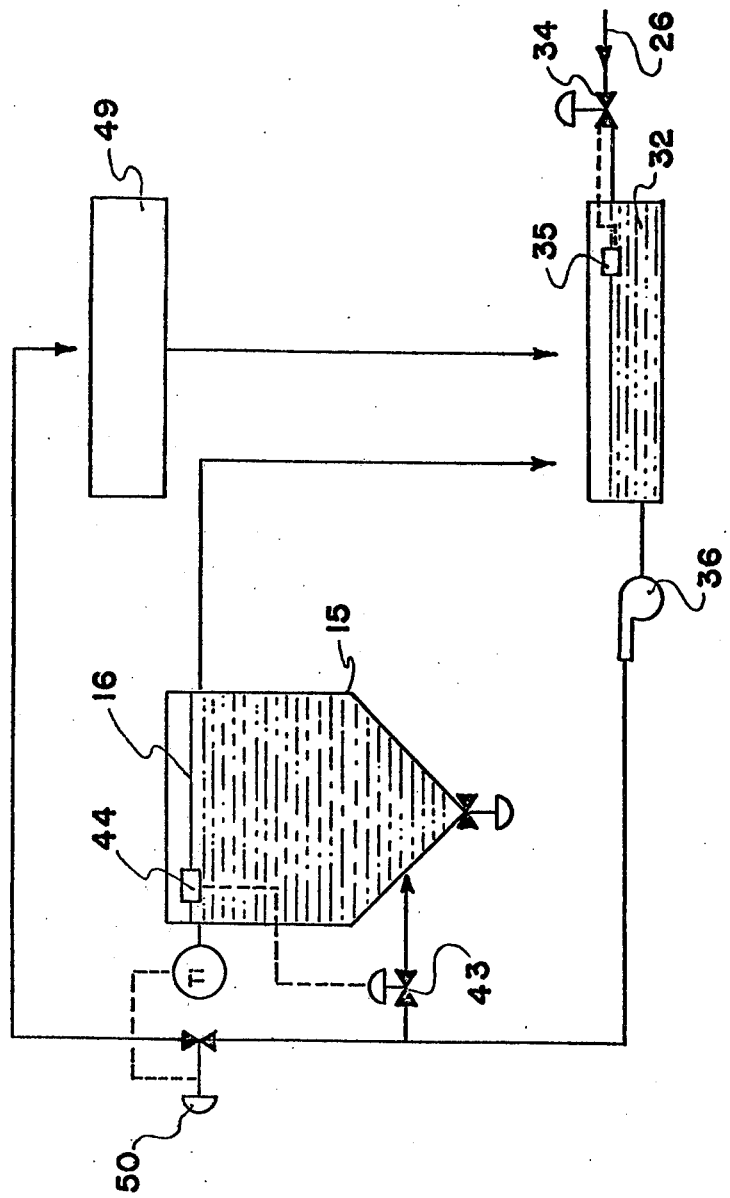
FIG. 4 is a schematic view of the temperature control system for the liquid cooling medium.

Effluent cooling liquid having passed screen 33 is collected in reservoir 32. Loss of liquid through evaporation is made up by supplying fresh liquid through line 24, the supply being controlled by inlet valve 34 in co-operation with float 35. Liquid is circulated from reservoir 32 along line 28 by pumping means such as an impeller pump 36 into heat exchanger 38. Air circulating means, such as a fan 39, drives warm air upwardly in the drying tower 37. This heat exchanger may also be used to maintain the coolant liquid at the required temperature and therefore may act as temperature control means for the coolant. However, the embodiment shown in FIG. 4 is preferred.

Sulphur pellets descending from conveyor 30 into drying tower 37 are deflected by a series of baffle plates 40 to increase their exposure time to the drying air. Cooled liquid exiting from heat exchanger 38 continues along line 26 into annealing chamber 15 as described hereinabove.

The pellets produced in the pelletizing vessel of FIG. 1 are substantially spherical in shape. The spherical shape has some disadvantage in that spheres tend to roll somewhat too readily and thus create problems in handling and also cannot be closely packed in storage because the spherical shape gives rise to large numbers of "holes" between spheres. In the pelletizing vessel 11 shown in FIG. 2, which is the preferred embodiment, there is provided a deflecting plate assembly 29 having a series of deflection plates 22 extending transversely across the cross-section of annealing chamber 15. As liquid sulphur droplets 21 descend through the liquid 16 they begin to anneal. By the time that they reach deflecting plate assembly 29 they are still in a semi-molten or plastic state and tend to flatten upon striking the deflecting plates 22. The angle of these plates to the horizontal may be varied from 2 to 89 degrees although it will be appreciated that the plates should at all times still lie across the path of descent of the droplets. A single fixed plate could equally well be substituted for the rotatable deflection plates exemplified in the drawing.

The vertical position of deflection plate assembly 29 within vessel 15 may be varied within fairly broad limits. The assembly must not be so close to outlet valve 31 that the pellets are completely hardened before contact therewith but it should be completely immersed so that the sulphur droplets have hardened to a plastic state. The flattened pellets are less prone to roll during handling and can be more compactly stored.

Sulphur droplets 21 are formed by allowing molten sulphur to fall through the openings of perforated plate 18 in the preferred embodiments exemplified in the drawings. However, any source such as a spray gun or extruder may be employed to obtain the sulphur droplets required in order to be within the ambit of this invention.

Figure 3:
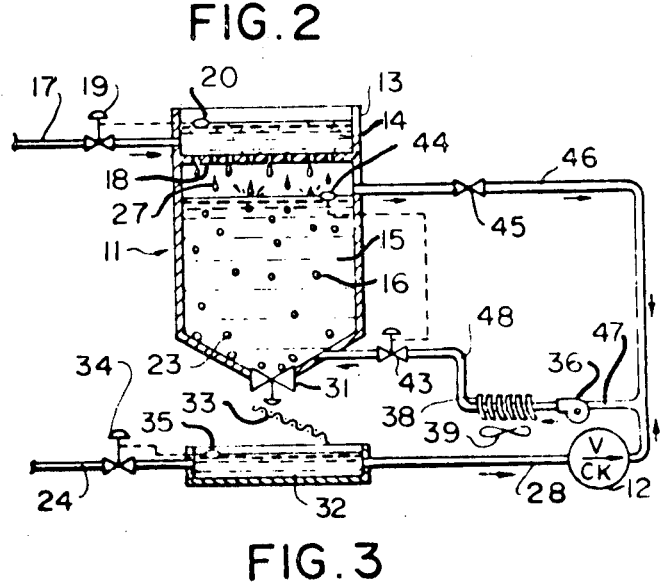
FIG. 3 is a schematic diagram of the annealing vessel and an alternative associated water circuit according to the invention.

A preferred embodiment of the apparatus according to the invention is shown in FIG. 3. The pelletizing vessel and the supplying, annealing, drying and recovery of sulphur are identical to those shown in FIGS. 1 and 2. However, the cooling liquid circulation has been reversed. We have found that if the cooling liquid 16 in annealing compartment 15 is circulated in counter-current (or in the opposite direction to the direction of movement of the droplets) with the molten sulphur droplets 21 passing therethrough then the optimum annealing effect is achieved. When such counter-current flow droplets of sulphur lose most of their heat upon first contact with the surface of the cooling liquid which of course takes up heat, and then are gradually further cooled as they pass into the lower (and cooler) regions of annealing chamber 15. The greater the initial drop in temperature as the sulphur droplet hits the cooling liquid, the less durable will be the sulphur pellet formed. However, a pellet of satisfactory hardness and durability may be formed even when the liquid temperature near its surface is as low as 150° F.

Counter-current or opposite flow between sulphur and cooling liquid is set up by providing an inlet valve 43 near the bottom of pelletizing vessel 11 for introducing cooled liquid and by providing an outlet valve 45 in the side of annealing compartment 15 in place of inlet valve 25 in the embodiments shown in FIGS. 1 and 2. Pump 36 ensures that the coolant moves upwardly in vessel 15 while the sulphur pellets move downwardly by gravity.

In operation, cooling liquid 16 is introduced through inlet valve 43. Liquid 16 is discharged through outlet valve 45 and along with sulphur pellets through outlet valve 31. The liquid being discharged at outlet valve 45 is substantially warmer than that discharged at outlet 31. From outlet valve 45 liquid is conducted along conduit 46 which meets conduit 28 bearing liquid from reservoir 32. Conduits 28 and 46 feed common conduit 47 which leads to impeller pump 36. The liquid is fed to heat exchanger 38 where fan 39 propels heated air from the heat exchanger into a dryer 37 as shown in FIG. 1. Cooled liquid is returned along line 48 to inlet valve 43.

Operation of valve 43 may be controlled by a float 44, a drop in the level of liquid 16 lowering float 44 thereby opening valve 43. Alternatively, a check valve 12 may be provided in conduit 28 allowing passage of liquid from reservoir 32 into conduit 47 but not the reverse. One or the other of floats 44 and check valve 12 must be provided, but both are not necessary. Conduit 46 is an overflow conduit and when the level of liquid 16 in chamber 15 is lower than outlet 45 conduit 46 would be empty. The pump 36 would in such a case be fed from reservoir 32. When liquid 16 in chamber 15 is at a level high enough to feed conduit 46 the pump 36 is fed from the conduit 46 source. In this manner a constant head of liquid 16 is maintained in chamber 15.

With reference to the temperature control means of FIG. 4, liquid 16 in the pelletizing tank 15 removes heat from the incoming molten sulphur 21 thereby increasing in temperature.

The hotter liquid in the top of the pelletizing tank 15 flows directly to the sump tank 32 via conduit 46 and then is pumped to both the pelletizing tank 15 and the heat removal unit 49. The amount of hot liquid entering the heat removal unit 49 is regulated by a control valve 50 which in turn is regulated by a temperature-sensing device Ti.

Specifically, as the pelletizing liquid 16 increases in temperature the sensor Ti is adjusted to proportionately open the control valve 50 thereby allowing hot liquid to enter the heat removal unit 49 which lowers the temperature of the liquid and returns it to the sump tank 32. In the sump tank 32 the colder liquid from the heat removal unit 49 co-mingles with the hot liquid from the pelletizer 15 thus producing a pelletizing liquid of the desired temperature. With direct reference to the heat removal unit 49 it can be any of many available commercial type heat removal units, e.g.:

(a) evaporative type cooler
(b) a direct heat exchanger (shell and tube, plate)
(c) refrigeration unit
(d) fin, fan cooler and may, of course, take the form of the heat exchanger 38 and fan 39.

It will, of course, be understood that deflecting plates (22 in FIG. 2) may be provided in annealing chamber 15 so that flattened pellets may be produced.

The apparatus according to this invention may be more completely understood by having reference to the following example:

EXAMPLE

A pelletizing apparatus according to FIG. 3 including a deflecting apparatus as shown in FIG. 2 was employed. The pelletizing vessel had an internal diameter of about 8 feet. Plate 18 was provided with 3/16 inch diameter circular holes on 1 inch centres. The distance between plate 18 and the surface of water 16 was ½ to 3 inches, the depth of water 16 to outlet 31 being about 8 inches. The deflecting plates were at an angle between 2° and 89° with the horizontal. The assembly 29 was positioned at between about 3 to about 36 inches below the water surface.

In operation, sulphur 14 was introduced into chamber 13 at a temperature between about 250° and 350° F. The rate of sulphur production when employing feeding plate 18 of the dimension herein was about 50 tons/hour. A constant head of sulphur was maintained in chamber 14 by means of float controlled valve 19.

Water 16, as the cooling liquid, was introduced into chamber 15 through valve 43 at a temperature of about 180° F. By introducing molten sulphur droplets 21 at the water surface a temperature gradient is set up in the water, the surface temperature of which approaches 230° F. The initial cooling of droplets 21 is thereby minimized and the optimum annealing attained by the gradual cooling achieved through the counter-current or opposite flow of sulphur and water.

The annealed sulphur pellets and a minor portion of the cooling water are discharged through outlet valve 31. The pellets 23 are separated from the water on screen 33 and fed by conveyor 30 into head exchanger 38. Control louvers are provided in heat exchanger 38, the operation of the louvers being controlled by a thermostat in water 16. In this way the flow of air past heat exchanger 38 for use in drier 37 may be varied. In normal operation, this air will be at a temperature between about 125° and 150° F. It will be seen that by varying the flow of air over heat exchanger 38 the heat lost by the water may be adjusted to be equivalent to the heat gained by the water from the sulphur.

In normal operation the flow rate along conduit 47 is 124 gpm, the bulk of the flow (120 gpm) being provided by recirculation through conduit 46, by the balance (4 gpm) make-up water being drawn from reservoir 32 via conduit 28.

The pellets produced were flattened and disc-like in shape and hard and durable in appearance.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. Apparatus for converting molten elemental sulphur into solid pellets which comprises: means for providing a source of molten sulphur, a chamber adapted to contain a liquid coolant medium at a temperature within a predetermined elevated temperature range of between 150° F. and 240° F.; means for introducing molten sulphur in droplet form into said chamber; means for removing sulphur pellets from the chamber at a point sufficiently remote from said means for introducing molten sulphur, that said droplets are permitted to anneal and a plate member disposed intermediate said means for introducing molten sulphur and said means for removing sulphur pellets adapted to deflect but not arrest sulphur during passage through said chamber, said plate member being adapted to deflect said sulphur within said liquid medium.

2. Apparatus as claimed in claim 1 in which said sulphur droplets move downwardly in said chamber by gravity, and means to circulate said liquid medium upwardly in said chamber whereby the liquid medium is moving in the opposite direction relative to said droplets.

3. Apparatus as claimed in claim 1 wherein there is provided in said second chamber in the area of said droplet forming means a second outlet orifice for removal of liquid therefrom and wherein said inlet means for said liquid medium is positioned in the area of said first outlet orifice, whereby there is created flow of liquid in counter-current with the flow of sulphur through said second chamber, said liquid moving upwardly through said second chamber, said sulphur droplets moving downwardly in said second chamber by gravity.

4. Apparatus as claimed in claim 2 wherein there is provided in said second chamber in the area of said droplet forming means a second outlet orifice for removal of liquid therefrom and wherein said inlet means for said liquid medium is positioned in the area of said first outlet orifice, whereby there is created flow of liquid in counter-current with the flow of sulphur through said second chamber, said liquid moving upwardly through said second chamber, said sulphur droplets moving downwardly in said second chamber by gravity.

5. Apparatus for converting molten elemental sulphur into solid pellets which comprises: a vessel, said vessel having a first chamber and a second chamber disposed adjacent to said first chamber; inlet means in said first chamber for introducing molten sulphur thereinto; droplet forming means communicating between said first chamber and said second chamber for dispensing droplets of molten sulphur from said first chamber into said second chamber; inlet means in said second chamber for introducing a liquid coolant thereinto; temperature controlling means for maintaining said liquid coolant in said second chamber within a predetermined elevated temperature range between 150° F. and 240° F. and a first outlet orifice in said second chamber at the bottom thereof for exhausting liquid coolant and solid pellets therefrom, said outlet orifice being restricted so that a predetermined depth of liquid coolant may be maintained in said second chamber and a plate member disposed intermediate said means for introducing molten sulphur and said means for removing sulphur pellets adapted to deflect but not arrest sulphur during passage through said chamber, said plate member being adapted to deflect said sulphur within said liquid medium.

6. Apparatus as claimed in claim 5 wherein said droplet forming means comprises a plate member dividing said vessel into said first and second chambers, said plate member being perforated with passages extending therethrough.

7. Apparatus as claimed in claim 5 wherein there is provided downstream from said first outlet orifice means for separating said exhausted liquid from said exhausted pellets.

8. Apparatus according to claim 5 wherein said liquid is water.

9. Apparatus as claimed in claim 5 wherein there is provided in said second chamber in the area of said droplet forming means a second outlet orifice for removal of liquid therefrom and wherein said inlet means for said liquid medium is positioned in the area of said first outlet orifice, whereby there is created flow of liquid in counter-current with the flow of sulphur through said second chamber, said liquid moving upwardly through said second chamber, said sulphur droplets moving downwardly, by gravity, in said second chamber.

10. Apparatus as claimed in claim 5 wherein there is provided, in said inlet means in said second chamber, control means for providing sufficient flow of liquid into said second chamber that said plate member remains completely immersed in said liquid.

11. Apparatus as claimed in claim 5 wherein said plate member comprises a plurality of deflection plates positioned to deflect droplets of sulphur passing through said second chamber, said deflection plates being selectively rotatable along their horizontal axis to thereby adjust their angles of deflection, there being present in said inlet means in said second chamber control means for providing sufficient flow of liquid into said second chamber that said deflection plates remain completely immersed.

12. Apparatus as claimed in claim 7 wherein there is provided reservoir means for recovering said exhausted liquid coolant and conduit means from said reservoir to said inlet means in said second chamber for recycling said exhausted liquid coolant, there being provided heat exchanging means in said conduit to cool said exhausted liquid coolant and maintain same in the said predetermined temperature range.

* * * * *